Nov. 23, 1943.                J. HALTENBERGER                2,335,058
                                 AUTOMOBILE
                            Filed Jan. 26, 1940           2 Sheets-Sheet 1

INVENTOR.

Jules Haltenberger

Nov. 23, 1943.　　　J. HALTENBERGER　　　2,335,058
AUTOMOBILE
Filed Jan. 26, 1940　　　2 Sheets-Sheet 2
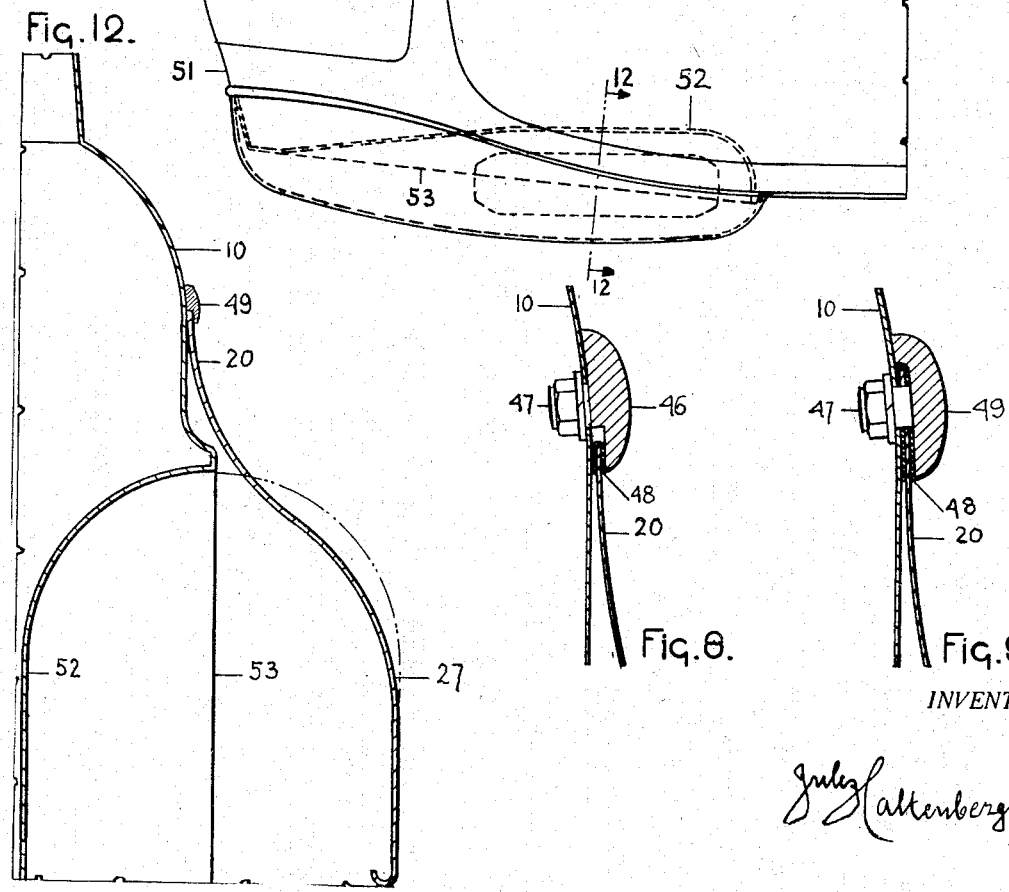
INVENTOR.
Jules Haltenberger Patented Nov. 23, 1943

2,335,058

UNITED STATES PATENT OFFICE 2,335,058

AUTOMOBILE

Jules Haltenberger, Ann Arbor, Mich.

Application January 26, 1940, Serial No. 315,822

3 Claims. (Cl. 296—28)

My invention relates to automobile construction.

It is the object of my invention to eliminate matched surfaces in automobile side constructions, to reduce costs and at the same time increase the lengthening effect.

A further object is to increase the cubic content of the luggage compartment by utilizing wasted space.

Further objects of my invention will appear as the description proceeds.

Figure 1:
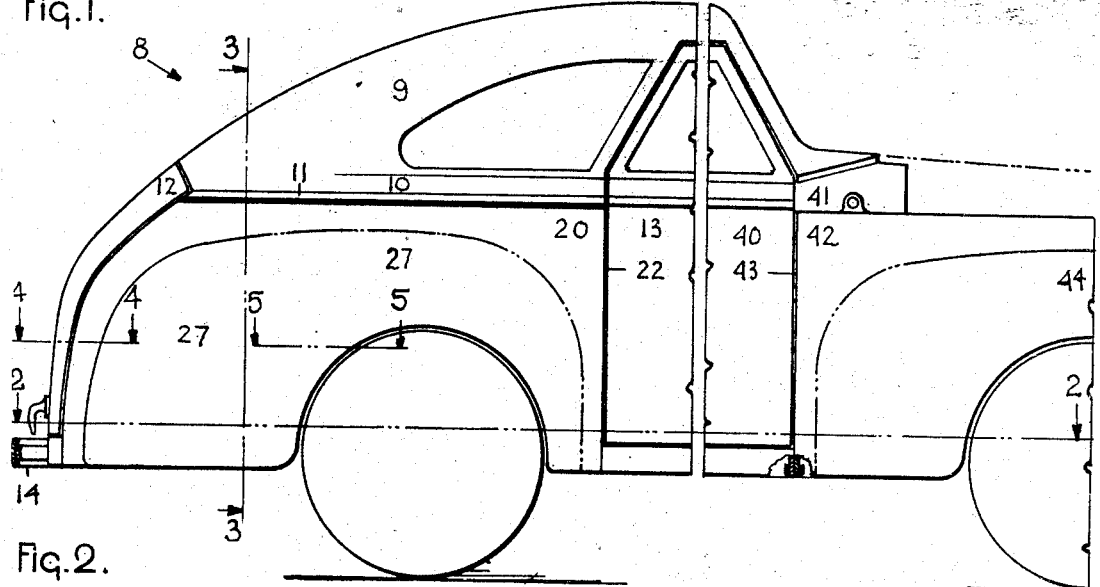
Figure 2:
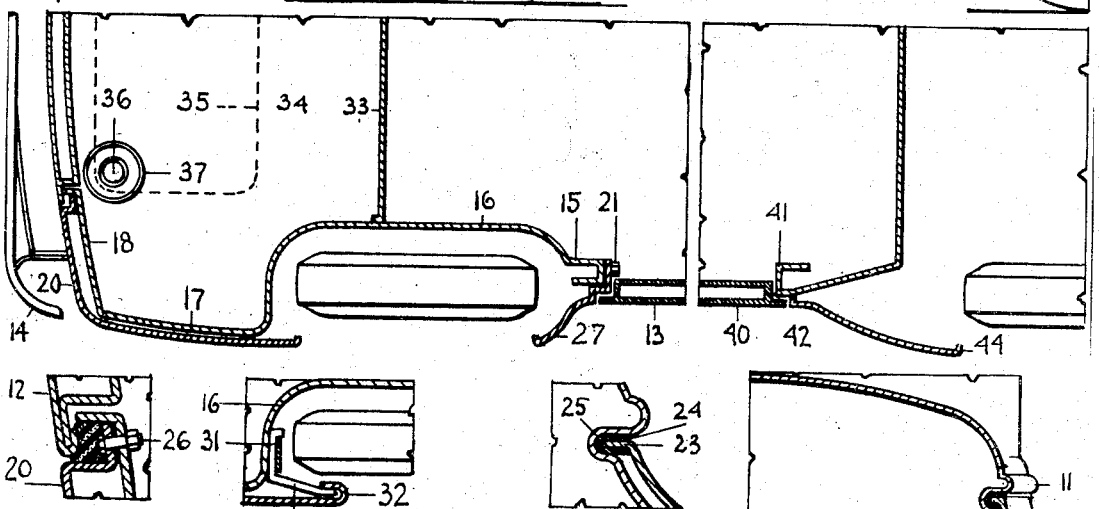
Figures 4, 5, 6:
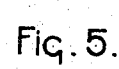
Figure 3:
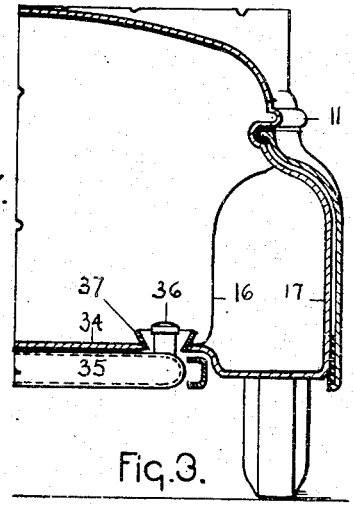
Figure 6:
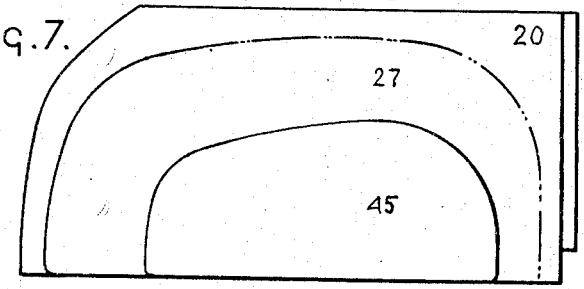
Figure 7:
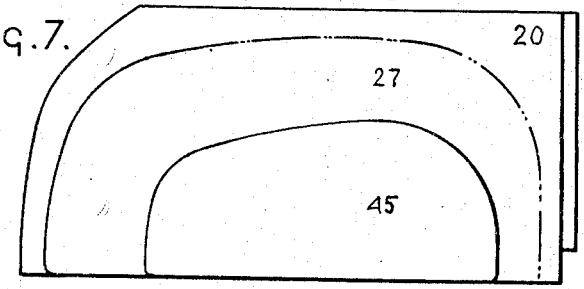

The accompanying drawings illustrate my invention. Here, Fig. 1 is a side elevation of an automobile; Fig. 2 is a section substantially on lines 2—2 of Fig. 1; Fig. 3 is a section substantially on lines 3—3 of Fig. 1; Fig. 3' is an enlargement of a part illustrated in Fig. 3; Fig. 4 is a section substantially on lines 4—4 of Fig. 1, shown in a larger scale; Fig. 5 is a section substantially on lines 5—5 of Fig. 1; Fig. 6 is a modification of the invention, illustrating a plan view of a body rear quarter panel and integral fender shield; Fig. 7 is a side elevation of Fig. 6; Fig. 8 is a large scale section illustrating one form of body side wall to quarter panel connection; Fig. 9 is a modification of the connection illustrated in Fig. 8; Fig. 10 is a modification of the invention illustrated in Fig. 1; Fig. 11 is a plan view of Fig. 10; Fig. 12 is a section substantially on lines 12—12 of Fig. 11 shown in a larger scale.

Referring to Figs. 1 to 5 inclusive, it will be seen that an automobile body generally at 8 is provided with a roof 9, body belt 10, body bead 11, luggage compartment door 12, body rear side doors 13 (only one is shown) and rear bumper 14.

Integral with the body structure is a body rear quarter having a door pillar 15, wheel housing 16, bulging luggage compartment side wall 17 and rear wall 18. The body rear quarter is covered by an integral quarter panel 20. At the front it is secured to the door pillar 15 by cap screws 21, and it is formed to create a usual door gap 22. The front exposed part of this panel is in surface alignment with the door; the top exposed wall is substantially in alignment with the base of the belt and is provided with an in-turned flange 23, and sealer 24, nesting in a groove 25. The rear end is formed to be in surface alignment with the luggage compartment door, where it is secured as by bolts 26. The main side exposed portion of the panel with large radii (indicated by a chain line) is formed into a fender 27.

The body bead line is placed on the body to be visible. The rear door gap and luggage compartment door gaps are "accepted." Between these demarkations the panel is free of joints and matched surfaces. By bulging the luggage compartment side wall the compartment content is materially increased (to full width of the automobile) and this bulge also strengthens the fender rear side wall to lessen the danger of "hooking" the bumper ends in case of a collision.

It is intended to secure the front and rear end of the panel while the mid-section of flange 23 is under an inward strain, and to further prevent a panel mid-section vibration. As shown in Fig. 5, I might provide a hinged spring arm 30 operatively mounted on the wheel housing as by sheet metal bearing cap 31. The end of the arm is arranged to engage an in-turned edge 32 of the fender.

The luggage compartment is provided with a usual front wall 33 and floor 34. As is clear from Figs. 2 and 3 (to save marring the panel for a gasoline filling opening) the usual gasoline tank 35 is provided with a filler cap 36 accessible from the inside of the normally locked luggage compartment, where a spill funnel 37 is also provided. This construction prevents theft of gasoline, and reduces the cost materially.

The body 8 is also provided with front side doors 40 (only one is shown), a cowl structure 41, a front panel 42 in surface alignment with door 40 and a usual door gap 43 between them. Preferably the panel 42 is formed into a fender 44 and at the rear, by using large radii as indicated by a chain line, both the front and rear panels receive the same styling, both reduce cost, increase lengthening effect, eliminate matched surfaces and decrease air resistance.

Figs. 6 and 7 illustrate the panel described above; here, with the addition of an integral fender shield 45. By making the shield integral with the panel, the shield cost is eliminated and this construction further decreases the air resistance. The shield strengthens the panel and the lock described in connection with Fig. 5 is eliminated.

The invention described in connection with Figs. 1, 3, 3', 6 and 7 indicate the use of a pressed out body bead 11. Many automobiles use chromium plated "mounted on" body beads. These beads can be used for holding the panel as illustrated in Fig. 8, where belt 10 supports a bead 46 as by studs 47 clamping an anti-squeak 48 on the upper edge of panel 20.

Fig. 9 is a modification; here, the upper edge of panel is perforated for the studs 47, and bead 49 provides a space above the studs.

When it is desired to reduce the initial body die cost or to change an existing construction quickly to a unit quarter panel construction, this is illustrated in Figs. 10, 11 and 12.

Here, a body 8 is provided with preferably a demountable body bead bead 49 secured to the body from the rear edge of door 13' to the base of rear wall 51. This bead secures the panel 20. The body is also provided with the usual wheel house 52, having a usual straight line fender mounting face 53. It is important to note that this face will not be used, as the panel 20 and therewith integral fender 27 is formed with curves of large radii (chain lines in Fig. 10) to hide this structure. In Fig. 12 the chain line indicates the usual shape and position of the fender that the unit panel is intended to displace.

What applicant claims as his invention:

1. In an automobile side construction, a body having a luggage compartment door at the rear, riding wheel, side doors having outer surfaces, demountable side panels at least partially defining the doorway edges of said side and compartment doors and substantially in surface alignment with said door surfaces and terminating at said luggage door, said panels having depending walls outside the plane of said riding wheels, and means for removably securing said panels to said body.

2. In an automobile side construction, a body having a rear end luggage compartment with bulging side walls substantially at the extreme width of the automobile and a rear luggage compartment door, riding wheels, side doors having outer surfaces, demountable side panels at least partially defining the doorway edges and substantially in surface alignment with said door surfaces, fenders integrally formed in said panels and having crowns over said riding wheels with depending walls on the outer side of said wheels, and means for removably securing said panels to said body.

3. In an automobile side construction, a body having a rear luggage compartment with bulging side walls substantially at the extreme width of the automobile and a rear luggage compartment door, riding wheels, side doors having outer surfaces and rear edges, demountable side panels at least partially defining the doorway edges adjacent said rear edges and substantially in surface alignment with said door surfaces and terminating at said luggage compartment door, fenders integrally formed in said panels and having crowns over said riding wheels and depending walls on the outer side of said wheels, and means for removably securing said panels to said body.

JULES HALTENBERGER.